United States Patent [19]

Anderson

[11] Patent Number: 4,621,273

[45] Date of Patent: Nov. 4, 1986

[54] PRINT HEAD FOR PRINTING OR VECTOR PLOTTING WITH A MULTIPLICITY OF LINE WIDTHS

[75] Inventor: Dean A. Anderson, San Diego, Calif.

[73] Assignee: Hewlett-Packard Company, Palo Alto, Calif.

[21] Appl. No.: 450,483

[22] Filed: Dec. 16, 1982

[51] Int. Cl.[4] .............................................. G01D 15/16
[52] U.S. Cl. .................................. 346/140 R; 400/121
[58] Field of Search ......................... 346/140 PD, 75; 400/121

[56] References Cited

U.S. PATENT DOCUMENTS

| 4,085,409 | 4/1978 | Paranjpe | 346/75 |
| 4,131,899 | 2/1977 | Christou | 346/140 PD |
| 4,374,388 | 2/1983 | Heinzl | 346/140 PD |
| 4,396,924 | 8/1983 | Rosenstock | 346/140 PD |
| 4,415,909 | 11/1983 | Italiano | 346/140 PD |

Primary Examiner—E. A. Goldberg
Assistant Examiner—Mark Reinhart
Attorney, Agent, or Firm—John A. Frazzini

[57] ABSTRACT

A dot printer is presented having an arrangement of dot emitters which is suitable for producing various line widths in a vector graphics mode as well as producing lines and characters of various sizes in a raster scan mode. The printer has emitters arranged in a pattern having one emitter in each row and in each column of the pattern. The pattern is formed from primitive dot patterns which can be utilized in the vector graphics mode to produce vectors of various line widths. The generation of dots is controlled to produce rounded terminations of line segments.

10 Claims, 9 Drawing Figures

PRINT HEAD FOR PRINTING OR VECTOR PLOTTING WITH A MULTIPLICITY OF LINE WIDTHS

BACKGROUND OF THE INVENTION

The disclosed invention relates in general to dot printers and more particularly to print heads capable of printing and vector plotting with a variety of line widths. Raster output is presently done with pin-printers (impact printers), thermal printers, electrostatic printers or ink jet printers. Pin-printers are noisy, slow, and susceptible to mechanical wear and breakdown. Thermal printers require special paper that is often inadequate for final copy and the dot quality is inconsistent. Electrostatic printers, besides being very expensive, usually can produce only one color. Present ink jet technology typically has low reliability, requires a pressurized ink system and has fairly low resolution (on the order of 80–100 dots per inch). With all of these technologies, the actual printing device is too cumbersome to move around or can only move slowly. These systems also typically do not enable positioning at any point on the page, but instead can print dots only at the intersections of a two-dimensional orthogonal grid of points.

Some of the problems associated with present plotters result from the pens that they use. The main quality concern in plotter output is line quality and consistency. Present felt tip plotter pens have two problems in this area. Felt tip pens are subject to wear, causing the resulting lines to get progressively thicker with use. Felt tip pens also dry out so that line quality degrades with time. Carbide tip pens have been used to overcome these problems but they require special pen force and are unreliable and difficult to use. Another potential solution to these problems are roller ball pens which are fairly new but show some promise. Ink jet pens have the advantage that the stylus never comes in contact with the paper and therefore don't wear down with use. Thus, ink jet pens are also a promising solution to these problems.

It would also be advantageous to have a single pen which can plot with a number of different line widths. Usually, different line widths are created by changing to a different width pen or by tracing repeatedly over a pattern to build up the desired thickness. The first of these methods requires the use of a multiplicity of pens and also requires interruption of a printing or plotting process to perform the exchange of pens. The second of these methods not only requires additional time to draw a pattern multiple times, but also burdens the host computer with retrace algorithms.

SUMMARY OF THE INVENTION

In accordance with the illustrated preferred embodiment, a printer is presented which can print, in either horizontal or vertical directions, characters having a variety of sizes and line widths and also can plot in either raster mode or vector mode with a variety of line widths. The print head is preferrably utilized as part of a thermal ink jet printer/plotter system because this enables the production of a high resolution pattern of dots. The preferred embodiment presented herein is therefore an ink jet print head which includes a nozzle plate through which the nozzles are formed and includes means for ejecting droplets through each of the nozzles. However, the nozzle pattern is also suitable for other types of systems such as thermal printers. In the general case, the nozzles and associated means for ejecting ink droplets is replaced by a dot generator which controllably produces dots on a recording medium located a suitable distance from the generator. The dot generator produces dots on the recording medium at points corresponding to the nozzle patterns utilized in the illustrated ink jet embodiment.

The illustrated ink jet print head has ink jet nozzles at selected points of a two-dimensional grid. It is an objective of the invention to have a print head that can print, in a single raster scan in either a horizontal or vertical direction, characters having a height up to the width of the print head. This requires that each row and each column of the grid contain at least one nozzle. ; It is also an objective to make the print head as mobile as possile so that it can be quickly moved to any point on a page for printing or plotting. It is therefore advantageous to minimize the number of connections to the print head. Therefore, there is only one nozzle on any given row in the grid and there is only one nozzle on any given column in the grid. To achieve this, the pattern is formed from primitive nozzle patterns each of which has only one nozzle in any given row or column.

Two primitive nozzle patterns were found to be particularly simple and useful. One primitive nozzle pattern utilizes four nozzles in a trapezoidal pattern and the other primitive nozzle pattern utilizes seven nozzles in an approximately hexagonal pattern. The nozzle pattern enables lines of approximately one, two and one half, or four times the diameter of a nozzle to be drawn. To be able to draw solid lines in any direction, for some ranges of nozzle spacing to nozzle diameter, it is necessary to use a mirror image of each primitive nozzle pattern in addition to the primitive nozzle patterns. These lines can be drawn along any vector with uniform line quality and spacing between deposited dots. The ejection of droplets from the nozzles is controlled to produce a rounded termination to lines drawn with the pen.

DESCRIPTION OF THE PREFERRED EMBODIMENT

Figure 3:
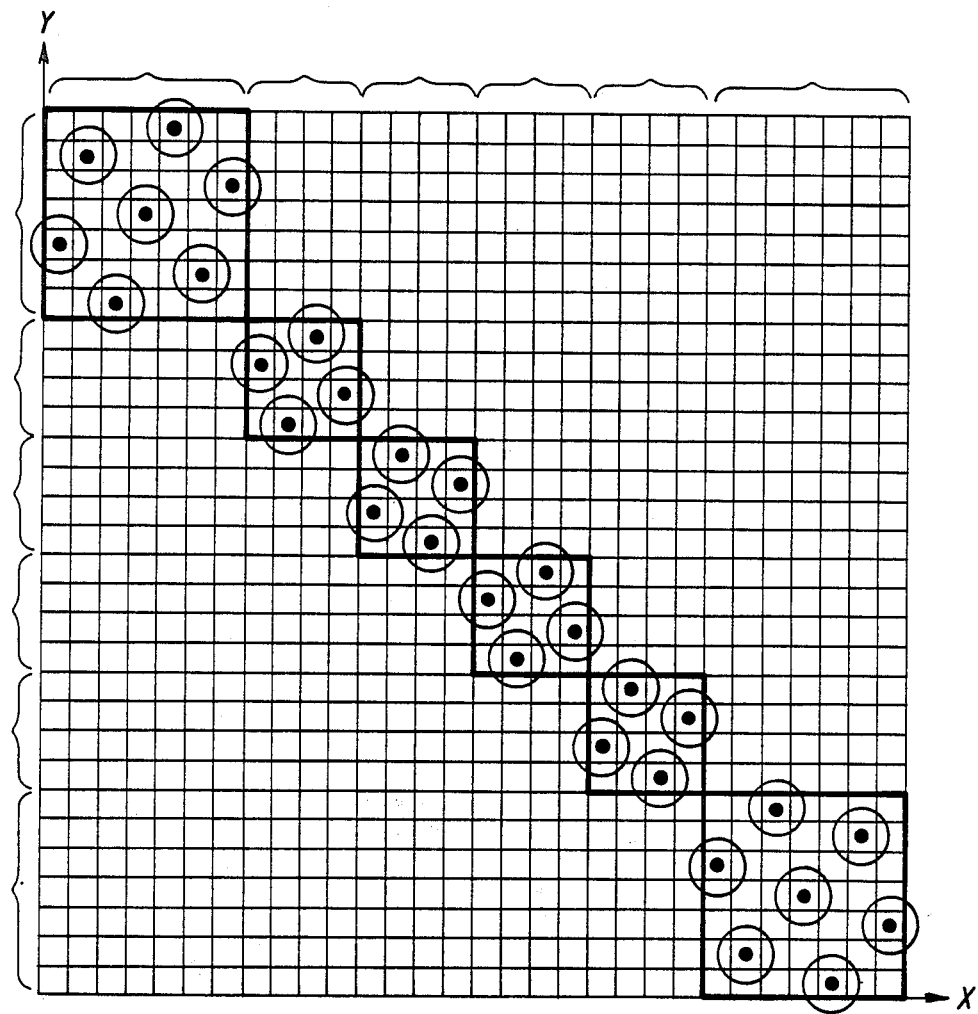
FIG. 3 shows an ink jet print head nozzle pattern utilizing two seven-nozzle primitive nozzle patterns as in FIGS. 1A and 1B and four four-nozzle primitive nozzle patterns as in FIGS. 2A and 2B.

In FIG. 3 is shown a two-dimensional orthogonal grid on which is displayed a print head nozzle pattern suitable for printing and for plotting in either raster or vector scan modes with a variety of line widths. The two dimensional grid divides the pattern into a 30×30 array of 4 mil by 4 mil squares. A set of squares along a line of constant y will be referred to herein as a row and a set of squares along a line of constant x will be referred to herein as a column. To enable ⅛ inch characters to be printed in a single raster scan in either the x-direction (also referred to herein as the horizontal direction) or the y-direction (also referred to herein as the vertical direction), each row and each column contains at least one nozzle. In order to minimize the number of electrical connections to the print head to help facilitate rapid motion of the print head for printing and plotting, each row and each column contain only one nozzle.

The nozzle pattern in FIG. 3 is formed from smaller primitive nozzle patterns illustrated in FIGS. 1A, 1B, 2A, and 2B. Each of these primitive nozzle patterns also contains a single nozzle in each row and in each column. The primitive nozzle pattern shown in FIG. 1A utilizes seven nozzles arranged in a pattern that is approximately hexagonal. This nozzle pattern will be referred to as the seven-nozzle primitive nozzle pattern. In order to center each nozzle inside of a square in the grid, the hexagonal pattern is somewhat deformed. This pattern contains nozzles 11-17 at points (0,0), (3,−1), (1,−3), (−2,−2), (−3,1), (−1,3), and (2,2), respectively, where each coordinate is measured in multiples of 4 mil units of distance.

Each printed dot is 8 mils in diameter so that in the x- and y-directions, each dot overlaps the dots in its adjacent rows by half a dot diameter (i.e. in the direction parallel to the columns, the extension of the dots in this direction is such that dots in adjacent rows overlap by half a diameter). Similarly, each dot overlaps dots in adjacent columns by half a dot diameter. This 50% overlap helps reduce the stair step appearance of the output of the print head. In a horizontal raster scan, the nozzles in individual rows are controlled to eject droplets to produce in a single scan ⅛ inch characters. In a vertical raster scan, the nozzles in individual columns are controlled to produce in a single scan ⅛ inch characters. In successive horizontal scans, the top dot is overlapped 50% onto the scan by the bottom dot in the previous scan. A similar overlap is also effected for vertical scans. Therefore, characters larger than ⅛ inch can be generated by multiple raster scans in either the horizontal or vertical directions.

Figure 1A:
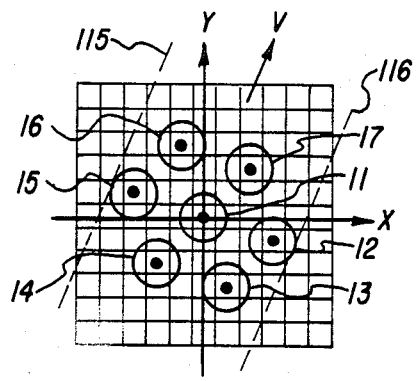
FIGS. 1A and 1B respectively show a seven-nozzle primitive nozzle pattern and its mirror image primitive nozzle pattern.
Figure 1B:
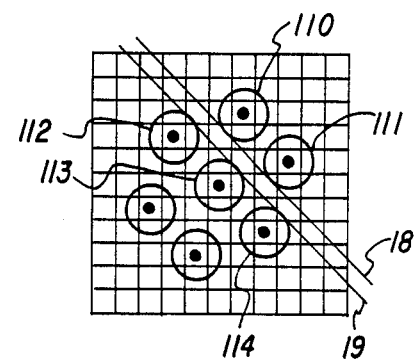

The primitive nozzle pattern shown in FIG. 1B is an alternative seven nozzle pattern containing one nozzle in each row and in each column. This pattern can be achieved from the pattern shown in FIG. 1A by a reflection across either the x-axis or across the y-axis. Patterns related by such symmetry will be referred to as conjugate patterns and the nozzle pattern in FIG. 1B will be referred to as the conjugate seven-nozzle primitive nozzle pattern.

For dots having a 50% overlap, the primitive nozzle pattern in FIG. 1B cannot draw solid lines in all directions. In that figure, line 18 tangent to nozzles 110 and 111 is parallel to line 19 tangent to nozzles 112, 113 and 114. If the nozzle in FIG. 1B is used to draw a line in a direction near the direction of lines 18 and 19, then a solid line will not be produced. Instead, the resulting line will have a gap along its length. For a vector drawn along the direction of lines 18 and 19, this gap has a width equal to the perpendicular distance between lines 18 and 19. Therefore, neither primitive pattern in FIGS. 1A and 1B can be used to draw lines in all directions. However, for dots having 50% overlap, the primitive pattern in FIG. 1A can be used to draw lines in the directions in which the primitive pattern in FIG. 1B cannot be used. Indeed, even for this nozzle pattern for overlap of at least 28%, the primitive nozzle pattern in FIG. 1A can be used to draw solid lines along all directions for which the primitive nozzle pattern in FIG. 1B cannot be used. For this reason, the print head pattern in FIG. 3 includes both of these primitive patterns.

Figure 2A:
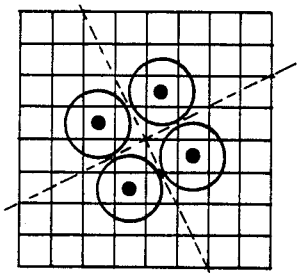
FIGS. 2A and 2B respectively show a four-nozzle primitive nozzle pattern and its mirror image primitive nozzle pattern.
Figure 2B:
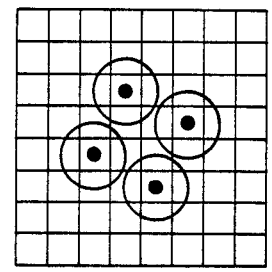

Two primitive nozzle patterns utilizing four nozzles and having one nozzle in each column and in each row are shown in FIGS. 2A and 2B. The primitive nozzle pattern in FIG. 2B can be obtained from the primitive nozzle pattern in FIG. 2A by a reflection across the x-axis or a reflection across the y-axis. These two patterns will also be referred to as conjugate primitive nozzle patterns. The pattern in FIG. 2A will be referred to as the four-nozzle primitive nozzle pattern and the pattern in FIG. 2B will be referred to as the conjugate four-nozzle primitive nozzle pattern. The dotted lines in FIG. 2A show the directions near which that primitive nozzle pattern cannot produce lines without gaps resulting along the lines. For 50% overlap between dots in adjacent rows and columns, the primitive nozzle pattern in FIG. 2B can be used to draw solid lines along all directions at which the pattern in FIG. 2A cannot be used. Therefore, the nozzle pattern in FIG. 3 includes both four-nozzle primitive nozzle patterns.

For the primitive nozzle pattern in FIG. 1B, the percent of overlap can be increased sufficiently to eliminate the perpendicular distance between lines 18 and 19 and yet retain some spacing between the nozzles. At that or larger overlaps, either seven-nozzle primitive nozzle pattern can be utilized to draw solid lines in any direction. For such an overlap, the nozzle pattern need contain only one of these two conjugate seven-nozzle primitive nozzle patterns. Unfortunately, this is not true for the four-nozzle primitive nozzle patterns in FIGS. 2A and 2B—only by increasing the dot diameter until adjacent dots are in contact can the gap be eliminated for all directions of vectors. Therefore, both four-nozzle primitive nozzle patterns must be used in any nozzle pattern in which either pattern is used.

In general, there are n! different nozzle patterns utilizing n nozzles and having one and only one nozzle in each row and in each column. However, for good line quality, a primitive nozzle pattern should also be able to close on itself (i.e. have no gaps along its length for any vector direction) and should have only a small variation in line width as a function of direction. The width of the resulting line along a given direction is equal to the spacing of two straight lines which are parallel to the direction of motion of the print head and are tangent to the outside of the nozzle pattern (e.g. lines 18 and 19 in FIG. 1A in the direction of vector V). These properties are easily tested by drawing a circle and observing whether the line width varies with angle and whether any gaps appear in either the radial or circumferential directions in the resulting line. For patterns of up to nine nozzles, only the primitive nozzle patterns discussed above had small line width variation with angle and achieved closure by use of both primitive nozzle patterns in a conjugate pair. The small variation in linewidth with angle results because these four patterns have their outer nozzles (i.e. the nozzles which can be contacted by parallel lines like lines 18 and 19 above) arranged approximately on a circular locus (i.e. a circle can be drawn which passes through each square in the pattern containing an outer nozzle).

Another advantage of the disclosed primitive nozzle patterns is that no two nozzles in adjacent rows are also in adjacent columns. This increases the spacing between adjacent nozzles leaving room for barriers between nozzles to reduce fluidic crosstalk between nozzles. If such barriers are not present, then pressure waves and fluid flow resulting in the ink because of ejection of a droplet of ink from a nozzle will disturb the ejection of droplets of ink from other nozzles. Thus, the four- and seven-nozzle primitive nozzle patterns discussed above have significant advantages over other choices of primitive nozzle patterns.

The nozzle pattern in FIG. 3, utilizing both four- and seven-nozzle primitive nozzle patterns and their conjugate nozzle patterns is capable of producing, in any direction, lines of 8 mil, 20 mil and 32 mil line widths. An 8 mil line is produced by utilizing any one of the 30 nozzles in the pattern. A 20 mil line is drawn by use of the four-nozzle primitive nozzle pattern and its conjugate pattern and a 32 mil line is drawn by use of the seven-nozzle primitive nozzle pattern and its conjugate nozzle pattern. There are $(6!/4)*(6!/4)$ different ways in which the 6 primitive nozzle patterns in FIG. 3 can be arranged while satisfying the requirement that each column and each row in the pattern have one and only one nozzle in it. Of these ways, the $6!/2$ ways in which they can be arranged along one of the diagonals are advantageous because, in a thermal ink drop generator, these patterns simplify the patterns of wiring needed to control the ejection of droplets.

In a raster scan mode of printing characters in either the vertical or horizontal directions, droplets of ink are ejected only in the center of selected pixels. In a vector mode of drawing a vector (i.e. a line having a given direction), a given nozzle is activated at a fixed frequency to eject droplets at equally spaced distances along the length of the vector. This contrasts with typical ink drop ejection devices which can only graph in raster scan mode with droplets ejected only in the centers of selected pixels. By spacing droplets uniformly along the length of a vector in a vector graphics mode, much more uniform lines can be drawn. The distance between dots along a vector is controlled by coordinating the frequency of ejection with the translational velocity of the print head. A 7 mil spacing between droplets has been found to give an optimal line quality on typical recording media. There is some flow of deposited ink producing a smoothing of the edges of lines so that the 12.5% overlap of dots along the length of a vector gives optimal uniformity. At closer spacing, the increased amount of deposited ink produces blurring of lines on many typical recording media.

Figure 4:
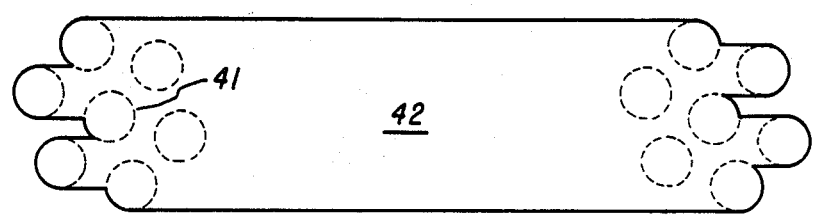
FIG. 4 illustrates the convoluted appearance of line terminations if all jets in a seven-jet primitive pattern are turned on concurrently in the process of drawing a line.

For the case of 32 mil line widths produced using the seven-nozzle primitive nozzle patterns, the resulting terminations of line segments have a ragged appearance if all of the nozzles are activated at substantially the same time. This problem is illustrated in FIG. 4, where it can be seen that if all of the nozzles of a seven-nozzle primitive nozzle pattern 41 are activated at substantially the same time for a vector in the horizontal direction, then the terminations of that line at the left and right of that figure, have a convoluted shape.

Figure 5:
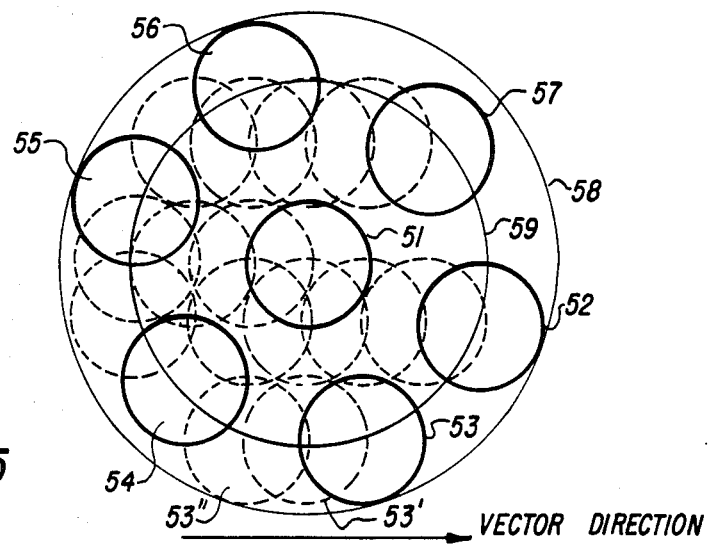
FIG. 5 shows how some ink jets need to be activated prior to other ink jets to produce rounded terminations of lines drawn with the print head nozzle pattern shown in FIG. 3.

To eliminate this raggedness in line segment terminations, the nozzles are not turned on and off together. The timing of when they are activated is illustrated in FIG. 5 for the seven-nozzle primitive nozzle pattern for the case of a 50% overlap of nozzles in adjacent rows, in adjacent columns and in displacement along the length of a vector. For the vector direction indicated in that figure, nozzle 52 is activated first, nozzle 57 begins ejecting droplets two cycles after nozzle 52, nozzle 51 begins ejecting droplets three cycles after nozzle 52, nozzle 53 begins ejecting droplets four cycles after nozzle 52, and nozzles 54–56 begin ejecting droplets six cycles after nozzle 52. These earlier droplets are illustrated by the dotted circles in that figure. For example, circles 53' and 53" illustrate the fact that nozzle 53 begins ejecting droplets two cycles ahead of nozzles 54–56. For any selected direction, the number of cycles a given nozzle is activated ahead or behind the other nozzles is selected to fill in circle 58 as smoothly as possible. This is achieved by activating each nozzle so that the center of its initial droplet is ejected as close as possible to circle 59.

In thermal ink jet droplet generators, the droplets of ink are not ejected concurrently from the nozzles since this would produce a large current spike in the common ground to the resistors in the emitters. Instead, the droplet ejection cycle for each nozzle is offset slightly from the others so that in thermal ink jets, the timing of when each nozzle is activated must also take account of the relative offset of the ejection cycle for that nozzle in relation to the other nozzles. In the present preferred embodiment, these relative offsets between ejection cycles do not notably affect the shape of line segment terminations and therefore, to simplify algorithms, they are ignored in calculating how many ejection cycles to start one nozzle ahead or behind other nozzles. In this embodiment, the relative offset between ejection of successive droplets from different nozzles is on the order of 5 microseconds so that the maximum offset between ejection cycles for different nozzles is on the order of 150 microseconds. In contrast, for the print head translation velocity and dot spacing along a vector in this embodiment, the time between droplet ejection from a given nozzle is on the order of 833 microseconds. Therefore, the offsets are small enough to ignore. For other embodiments, the offsets may need to be taken into account in calculating the number of ejection cycles to start ahead of or behind other nozzles. In these embodiments, the criterion of how many ejection cycles to start ahead of or behind the other nozzles remains the same—namely, that the initial droplet from each nozzle must be as close as possible to circle 59.

Figure 6:
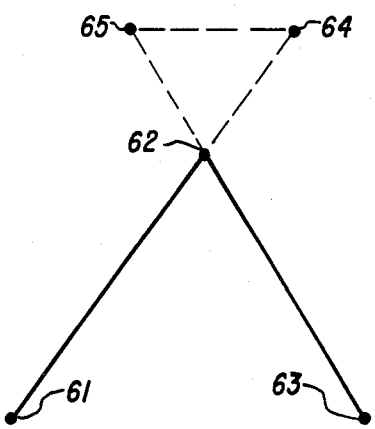
FIG. 6 shows the path a print head traverses to produce a rounded corner.

The delay in the activation of some nozzles relative to others to produce rounded terminations complicates somewhat the path that a print head must follow to produce a given pattern. This is illustrated in FIG. 6. In order to draw a line from point 61 to point 62 and then to point 63, the print head must actually follow the trajectory from point 61 to point 64, on to point 65 and finally on to point 63. The amount of overshoot from point 62 to point 64 is minimally sufficient for the print head to produce a rounded termination to the line segment from point 61 to point 62 as discussed with respect to FIGS. 4 and 5. Similarly, the overshoot from point 65 to point 62 is minimally sufficient to produce a rounded line segment termination at point 62 for the line segment from point 62 to point 63.

As was discussed above, conjugate primitive nozzle patterns 31 and 36 in FIG. 3 cannot each be utilized to draw 32 mil wide vectors in all directions. Instead, for certain ranges of directions, pattern 31 will be used and in all other directions, pattern 36 will be used. A switch from pattern 31 to pattern 36 is effected by interrupting the ejection cycles of the nozzles in pattern 31, translating the print head in the direction from the center of pattern 36 to the center of pattern 31 to locate the center of pattern 36 where the center of pattern 31 had been, and then beginning ejection cycles for the nozzles in pattern 36.

Figure 7:
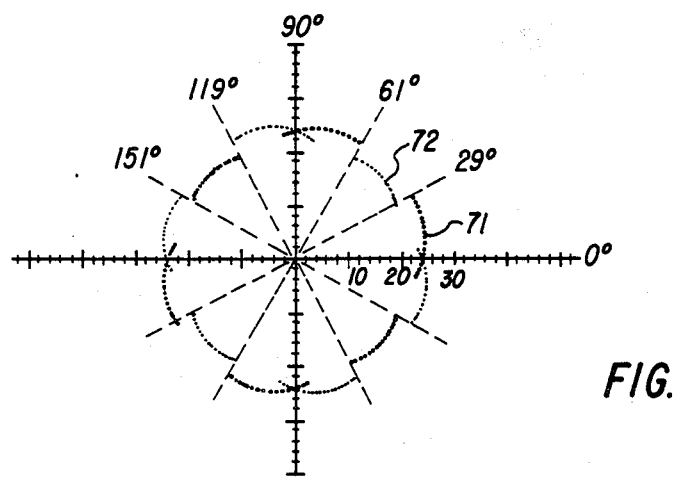
FIG. 7 plots the line width as a function of the direction of the line for a line plotted with the nozzle pattern shown in FIGS. 1A and 1B.

The angular directions of vectors for which each of patterns 31 and 36 are utilized is shown in FIG. 7. In that figure is a plot of the linewidth of a vector as a function of direction for the case of a 28% overlap of nozzles in adjacent rows and in adjacent columns. At this overlap, pattern 31 can produce solid lines (i.e. lines without gaps along their length) only in the directions from 0-29 degrees, 61-90 degrees, 119-151 degrees, 180-209 degrees, 241-170 degrees, and 299-331 degrees. Similarly, pattern 36 can only produce solid lines in the remaining directions. Therefore, the appropriate one of patterns 31 and 36 is selected to draw a 32 mil wide vector depending on which of these ranges the direction of the vector to be drawn is in. These ranges of directions are also used for nozzles having a larger amount of overlap than 28%.

In a similar manner, 20 mil wide vectors are drawn using either pattern 32 or 34 only if the direction of the vector is within the ranges 0-45 degrees, 90-135 degrees, 180-225 degrees or 270-315 degrees. Pattern 33 or 35 is used to draw 20 mil wide lines in all other directions. The choice of which pattern is used at the endpoints of these ranges is rather arbitrary, so that pattern 31 can, for example, be used at both 0 and 29 degree end points, at only one of them or at neither of them. Similar flexibility in the choice at the endpoints exists for the four-nozzle primitive nozzle patterns.

The fact that patterns 32 and 34 are identical allows some choice as to which of them is used to draw a given segment of a 20 mil wide line. To equalize the amount of wear on the droplet emitters associated with each of these patterns, it is advantageous to equalize the amount of use of each of these patterns. Complicated algorithms can be used to equalize this time including keeping a running tab of the duration each has been used, but the simplest way to achieve this is to merely alternate between these two when a segment (i.e. a continuous line drawn using the same primitive nozzle pattern for the whole segment) of a 20 mil wide vector is to be drawn having a direction within the ranges of angles for which patterns 32 and 34 are utilized. Similar equalization between patterns 33 and 35 is also effected. In order to further equalize the use of each emitter, when a single nozzle is utilized to draw an 8 mil wide vector, the choice of which nozzle is used is rotated through the list of nozzles.

I claim:

1. A print head suitable for vector mode plotting as well as raster mode printing and plotting, said print head comprising:
   means for producing on a recording medium, without rotation or translation of the print head, a first primitive pattern of dots located in a first two-dimensional rectangular grid substantially at the points (0,0), (3,−1), (1,−3), (−2,−2), (−3,1), (−1,3), and (2,2); and
   means for producing on the recording medium, without rotation or translation of the print head, a second primitive pattern of dots located in a second two-dimensional rectangular grid at the points (0,0), (3,1), (1,3), (−2,2), (−3,−1), (−1,−3), and (2,−2), where the x- and y-axis of the first grid are each parallel to the x- and y-axis of the second grid, respectively.

2. A print head as in claim 1 wherein each of the means for producing a primitive dot pattern comprises a plurality of dot emitters, each of which is located in a pattern that is geometrically similar to the primitive pattern of dots produced by that means for producing a primitive dot pattern.

3. A print head as in claim 2 further comprising means for activating only a single dot emitter within a primitive pattern and for alternating the selection of which dot is utilized to draw different line segments of one dot diameter line width, whereby the amount of use of each dot emitter will be approximately equal to equalize wear on each of the dot emitters.

4. A print head as in claim 2 further comprising:
   a plurality of dot emitters, each of which is located in a primitive pattern that is geometrically similar to one of said third and fourth primitive patterns; and
   means for alternating the selection of which of a set of identical primitive dot patterns is utilized to draw different line segments of the line width produced by these primitive dot patterns, whereby the amount of use of the dot emitters associated with these primitive dot patterns will be approximately equalized to equalize wear on each of these dot emitters.

5. A print head as in claim 2 further comprising means for individually initiating and terminating the activation of dot emitters in a primitive dot pattern such that in vector mode the centers of the dots produced at both ends of each vector line are located substantially on the locus of points of a semicircle, whereby a rounded termination of vector lines is produced instead of a jagged termination as would result if all of the dot emitters were activated for identical time intervals.

6. A print head suitable for vector mode plotting as well as raster mode printing and plotting, said print head comprising:
   means for producing on a recording medium, without rotation or translation of the print head, a third primitive pattern of dots located in a third two-dimensional rectangular grid substantially at the points (3,−1), (−1,−3), (−3,1), and (1,3); and
   means for producing on the recording medium, without rotation or translation of the print head, a fourth primitive pattern of dots located in a fourth two-dimensional rectangular grid at the points (3,1), (−1,3), (−3,−1), and (1,−3), where the x- and y-axis of the third grid are each parallel to the x- and y-axis of the fourth grid, respectively.

7. A print head as in claim 6 wherein each of the means for producing a primitive dot pattern comprises a plurality of dot emitters, each of which is located in a pattern that is geometrically similar to the primitive pattern of dots produced by that means for producing a primitive dot pattern.

8. A print head as in claim 7 further comprising means for activating only a single dot emitter within a primitive pattern and for alternating the election of which dot is utilized to draw different line segments of one dot diameter line width, whereby the amount of use of each dot emitter will be approximately equal to equalize wear on each of the dot emitters.

9. A print head as in claim 7 further comprising:
a plurality of dot emitters, each of which is located in a primitive pattern that is geometrically similar to one of said third and fourth primitive patterns; and
means for alternating the selection of which of a set of identical primitive dot patterns is utilized to draw different line segments of the line width produced by these primitive dot patterns, whereby the amount of use of the dot emitters associated with these primitive dot patterns will be approximately equalized to equalize wear on each of these dot emitters.

10. A print head as in claim 2 further comprising means for individually initiating and terminating the activation of dot emitters in a primitive dot pattern such that in vector mode the centers of the dots produced at both ends of each vector line are located substantially on the locus of points of a semicircle, whereby a rounded termination of vector lines is produced instead of a jagged termination as would result if all of the dot emitters were activated for identical time intervals.

* * * * *